Figure 2:
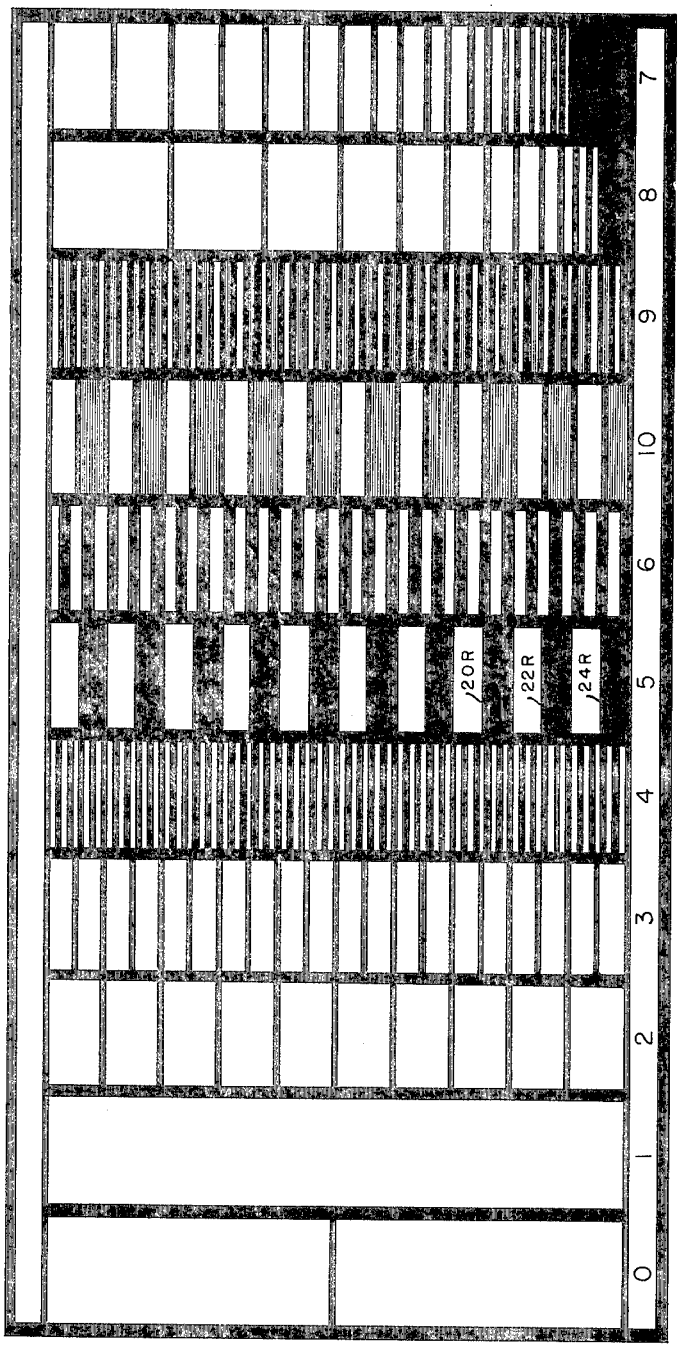

Oct. 26, 1965    H. C. EBERLINE    3,214,515
IMAGE CONTOUR PLOTTER
Filed Nov. 24, 1958    2 Sheets-Sheet 1
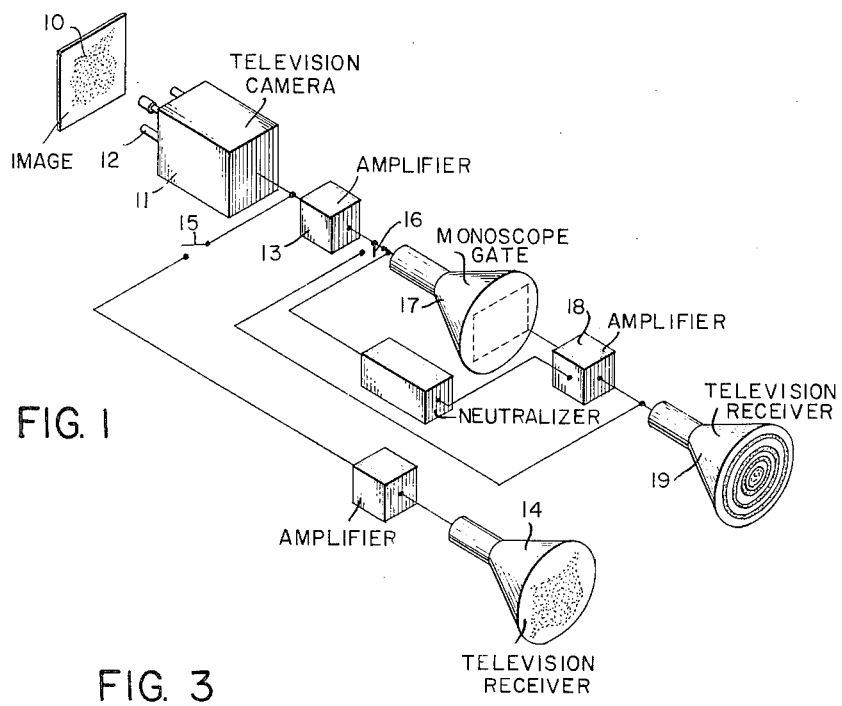
FIG. 1
FIG. 3
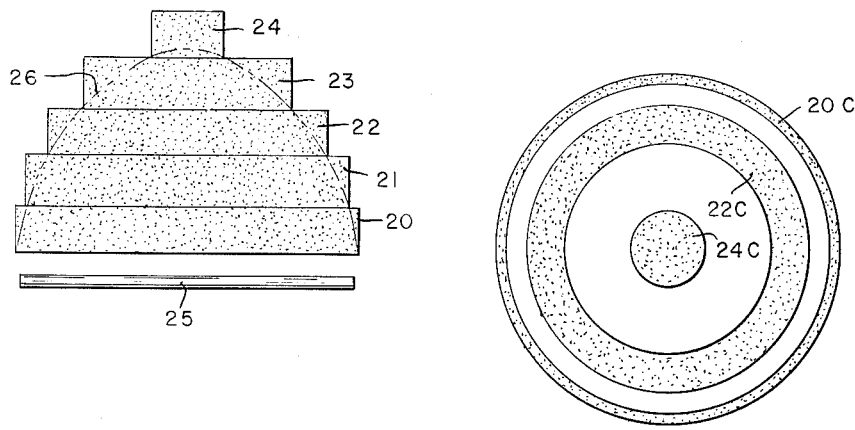
FIG. 5    FIG. 4
FIG. 6
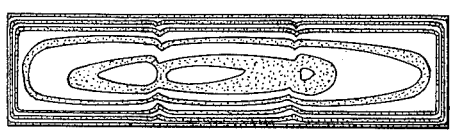
INVENTOR
H. C. EBERLINE
BY A. Yates Dowell
ATTORNEY Oct. 26, 1965  H. C. EBERLINE  3,214,515
IMAGE CONTOUR PLOTTER
Filed Nov. 24, 1958  2 Sheets-Sheet 2

INVENTOR
H. C. EBERLINE
BY A. Yates Dowell
ATTORNEY

United States Patent Office 3,214,515
Patented Oct. 26, 1965

3,214,515
IMAGE CONTOUR PLOTTER
Howard C. Eberline, Santa Fe, N. Mex., assignor to Eberline Instrument Corporation, Santa Fe, N. Mex.
Filed Nov. 24, 1958, Ser. No. 775,848
5 Claims. (Cl. 178—6.8)

The present invention relates to the interpretation of images regardless of whether such images are observed directly or through photographs, X-rays or the like, and relates to effectively interpreting the information beyond the ability of the human eye.

Heretofore, it has been customary to interpret images by means of the unaided eye, and by microscopes and the like. When an interpretation required accurate observation of differences in density including darkness and brightness of an image, particularly where the density is in the dark region, small differences in density cannot be accurately observed and therefore physicians have had difficulty interpreting X-rays and professional soldiers have had difficulty interpreting aerial photographs interpreting direct observations of camouflage and the like. Similarly, weather observers observing storms with radar have not been able to effectively locate the center of disturbance because of the gradual gradations from one point of observation to an adjacent point.

Various attempts have been made to overcome these difficulties by taking observations such as taking pictures of varying density in the resulting images, but all methods previously known to applicant have not satisfactorily solved the problem. Some attempts have been made at comparison of densities but such comparisons have been made with a single limit but not between two selected adjustable limits or between a plurality of pairs of selected adjustable limits to indicate a series of selected different densities.

An object of the present invention is to provide a method and apparatus for effectively reading the information obtainable from an image whether such image is in the form of the actual physical embodiment thereof, a photograph thereof, an X-ray image or a gamma ray image thereof.

Another object is to provide apparatus by means of which an image can be observed and analyzed at a distance from the actual location thereof.

A further object is to provide apparatus by means of which an observer may be able to interpret a large amount of information from a single viewing or reproduction of the actual image itself.

Other and further objects will be apparent as the description proceeds and upon reference to the accompanying drawings wherein:

FIG. 1 is a schematic isometric view of equipment for effectively obtaining information from an image and illustrating an image, a camera for observing the image, an electronic gating means for selecting the portions of the image to be reproduced and a receiving screen on which the information is reproduced and also showing means for simultaneously obtaining a duplicate reproduction of the image;

FIG. 2, an elevational view of a monoscope screen having a gating pattern imprinted thereon by means of which contours of selected density can be produced from an image;

FIG. 3, represents a structure to show photographic density in an image, a picture, or a film by means of stacked disks of predetermined density and of varying sizes;

FIG. 4, a plan view of diagram resulting from selected densities which would be reproduced from an image having the density characteristics indicated by the structure in FIG. 3;

FIG. 5, a view of a cylindrical pin as directly observed; and

FIG. 6, an enlarged view of a gamma graph of the same pin enlarged by the equipment of the present invention as seen on the viewing screen after the selection of a predetermined number of density contours from the gamma graph image of such pin.

Briefly, the present invention includes apparatus and method for interpreting images by direct observation of the image, of a photograph thereof, of a film thereof or of a screen having the image formed thereon and obtaining information from the observation for more accurately determining the structure disclosed in the image. An image is observed by a television type camera and the screen of such camera is scanned in a well known manner by an electron beam to obtain variations in the flow of electrons based on the illumination of the screen from the observed image. The apparatus includes a television receiver with the usual circuits and electronic system to produce an identical scanning of the television type receiver screen. In the conventional use of this type of equipment the image reproduced on the screen of the television receiver is substantially identical with the image observed by the camera.

The present invention provides a gating means between the television camera and the television receiver with such gating means effective to limit the passage of the electrons from the cathode of the receiver to the receiver screen to produce complete shut off of the flow of electrons in the scanning beam or maximum flow of electrons in the scanning beam thereby producing definite white or definite black reproductions on the receiver screen. The gating means is designed to cut off or cause the electron beam of the receiver to be energized or de-energized in accordance with a selected density or selected densities in the observed image to thereby reproduce in black and white on the television receiver the portions of the image having the selected density or densities with each selected density having a definite upper and lower limit. This results in a diagram of the areas of the image having the selected density. Suitable amplifiers and triggering circuits are provided to obtain this complete cut off and maximum flow of electrons in the electron beam of the receiver. A particularly advantageous manner of obtaining the gating action is by the use of the monoscope tube with an electron beam scanning selected printed gating ladder formations as the electron beam of the monoscope tube is caused to scan the ladder from the bottom toward the top in accordance with signals produced by the scanning of the screen of the camera.

Simultaneously, with the observation of the diagram showing contours of the selected densities produced on one receiver screen by the gating action, a reproduction of the original image may be made on a second television receiver screen thereby making it possible for an observer of the two receivers to more definitely interpret the results.

The method and apparatus are particularly suitable for interpreting X-ray films, interpreting fluoroscopic screens of X-rays, locating camouflage, observing storms by viewing a radar screen and the like.

Upon more detailed reference to the drawings an image 10 which may be a photograph is in focus with a television type camera 11 having a turret with a plurality lens system 12 on such turret with one lens system in focus. An image is formed on the screen of the camera in a well known manner. The camera screen is scanned with an electron beam from which variation in the flow of the electrons passing from the screen occurs in accordance with the intensity of light formed by the image on the camera screen. The scanning is done in the usual manner known in the the art to cover the complete camera screen. The output from the camera screen resulting from the electron beam scanning is then fed to a conventional cathode ray receiver tube 14 by suitable circuits controlled by switching arrangement 15 whereby a duplicate of the image 10 is reproduced on the screen of the receiver 14.

Simultaneously or alternatively, the output from an amplifier such as 13 may be selectively connected by a 2-way switch 16 to a monoscope tube 17 and the electron beam of such monoscope suitable controlled for oscillation in accordance with the brightness of the image formed on the camera screen.

The target of the monoscope tube is formed by a deposit of conductive material with low secondary emission ratio (i.e., ratio of electrons leaving surface to electrons striking surface), such as carbon, on a surface of high secondary emission ratio, such as polished aluminum, forming a series of ladder-like sections of which deposits of the low secondary emission conductive material are the "rungs." The electron beam of the monoscope is guided by the usual plates or coils to a selected one of the ladders and the amplified signal from the television camera serves to move the electron beam of the monoscope from the lower end toward the upper end of the selected ladder, the amplitude of movement of such electron beam up the selected ladder being proportional to the voltage produced as a result of the scanning of the image on the camera screen. For example, assuming the electron beam of the monoscope is adjusted for movement up ladder 5, the bottom end of the ladder corresponds to black in the image and the top represents white. As the electron beam is moved up the ladder, the electrons thereof impinge on a carbon coated portion of the aluminum screen forming a rung and then on the aluminum portion of the ladder so that the flow of electrons from the target varies in accordance with whether the beam is impinging on the carbon coating or directly on the aluminum of the screen of the monoscope tube 17. The flow of electrons from the target of the monoscope tube control an amplifier and trigger system 18 which serves to trigger the electron beam from the cathode of the television receiver to completely cut off the electron beam of the receiver tube 19 or allow maximum flow of electrons.

It will be apparent that the electron beam of the television receiver scans the receiver in synchronism with the scanning of the television camera screen but the flow of electrons from the cathode of the television receiver tube 19 is triggered to on or off positions by the passage of the electron beam up the ladder 5 as the beam successively crosses the carbon coated rungs of the ladder and the exposed aluminum portions between the rungs. As a result a definite white and a definite black are formed by the electron beam of receiver tube 19 being on or cut off thereby forming the diagram appearing on the screen of the cathode ray receiver tube 19 and such definite white and black form contour lines corresponding to the portions of the image which have the selected density corresponding to the rung of the ladder 5 which the electron beam of the monoscope crosses at the instant the electron beam of receiver 19 is on the corresponding portion of the screen.

If desired the signal from the television camera can be directly applied to the television receiver tube 19 by the selective positioning of the switch 16 and the image 10 observed by the camera will be reproduced in the television receiver tube 19 and will be identical with the image formed on the screen of receiver tube 14.

In some situations it is desirable to have the image and the contour diagram on the same screen and by alternately moving switch 16 from the monoscope operating position to the direct picture position, this change may be done rapidly so that a person can quickly get the information desired from a single television receiver tube.

To more clearly illustrate the inventive concept, the showing in FIG. 3 illustrates a plurality of translucent disks 20, 21, 22, 23 and 24 having identical densities so that each disk has the same attenuation to the transmission of light therethrough. The disks are arranged in a stack so that light transmitted therethrough from a source such as a light 25 will pass through the base disk 20 and upon viewing the stack of disks from the top, it will be apparent that more light will pass through the peripheral portion of the disk 20 which is not covered by other disks and similarly more light will pass through the peripheral portions of disks 20 and 21 in the portions which are not covered by the other disks and consequently there will be a variation of the darkness of the observed image as seen from the top with the darkest portion being at the center as observed through top disk 24. Assuming that the camera 11 is focused on the top of the stack of density disks shown in FIG. 3 an image of relatively light grey would appear at the peripheral portion of the disk 20 and would be progessively darker on the peripheral portions of the successive disk 21, 22 and 23 and would be darkest over the top disk 24.

Similarly in observing various types of images similar gradations in density will occur and particularly in the dark ranges it is extremely difficult to observe variations of density with sufficient accuracy to make the reading meaningful to the observer.

Assuming that camera 11 is focused on the top of the density arrangement described in FIG. 3 the television receiver 19 when the signals are gated by the monoscope tube 17 would reproduce a diagram substantially identical with that shown in FIG. 4.

To explain the operation of the equipment by which this is obtained it will be assumed that the electron beam of the monoscope 17 is controlled to move up and down the ladder 5 and since three contours are formed, the amplitude of the vertical movement of the electron beam will be such as to pass rungs 24R, 22R and 20R which correspond to the density of the image produced by the transmission of light through all of the disks 20 to 24 inclusive, through 20 to 22 inclusive, and through the single disk 20 respectively and the contour lines of the diagram (FIG. 4) which would be formed on the receiver tube 19 are designated 24C, 22C and 20C respectively corresponding to the rungs 24R, 22R and 20R respectively of the ladder 5. If the stack of disks were shaped to correspond to the curved line 26 the contour diagram would be the same.

It will be apparent that the electron beam of the monoscope moves upwardly crossing the rungs of the ladder thereby producing contours corresponding to the selected density in accordance with the rungs of the ladder of the monoscope screen.

The electron beam of the monoscope 18 is controlled by the usual coils or deflection plates in such a way as to direct the electron beam on any particular ladder 0 to 10 on the monoscope screen. Also, the electron beam of the monoscope may be biased in a manner to start its vertical deflection in a different relative vertical position on the target. For example upon reference to ladder 0, the single rung of the ladder thereof is crossed by the monoscope electron beam, the monoscope electron beam being biased in a direction so that the monoscope electron beam will pass the rung of ladder 0 only at top illumination level of the image observed by the camera or the electron beam may be biased so that the single rung of the ladder 0 is closely adjacent the position in which the electron beam of the monoscope is in a dark region whereby any selected level of density may be obtained for a single contour by the use of the ladder 0.

Similarly by controlling the amplitude of the signal that deflects the monoscope electron beam the brightest portion of the image seen by the camera can be made to reach any one of the "rungs" on a ladder yet the darkest portion remains on the lower "rung," whereby any selected width of densities may be presented as a single contour on the television receiver tube 19.

As an example, if the gain of amplifier 13 is such the brightest portion of image 10 seen by the television camera 11 will deflect the monoscope electron beam to the lower edge of 22R "rung" on ladder 5 of the monoscope's target and when darkest portion is seen by the camera the monoscope's beam is deflected to lower edge of 24R "rung," then the television receiver tube 19 will have one contour line with a density range of one half the full range of the image 10. This type of an adjustment may be used with any of the ladders.

It will be noted that ladders 7 and 8 have logarithmic spacing in the arrangement of the rungs whereby different characteristics can be obtained in the resulting diagram.

The present invention is particularly useful for reading pictures, reading developed X-ray films, reading fluoroscopic screens, and reading radar screens as well as direct observation of objects.

An illustration of one use of the invention is shown in FIGS. 5 and 6 of an observation of a cylindrical pin welded from 3 cylindrical sections. FIG. 5 represents the original object as it would appear on receiver tube 14, a gamma graph was made thereof, such gamma graph corresponding to an X-ray picture of the pin. The gamma graph was positioned within the focus of the camera 11 with one of the magnifying lens system 12 used therewith to increase the size of the gamma graph to an enlarged size of the order shown in FIG. 6 and the contours of density in the gamma graph were formed on the screen of the television receiver tube 19 by use of the monoscope gate with a ladder such as ladder 2 with the results forming the diagram shown in FIG. 6. It will be evident that the density lines occur in closely spaced relation at the edge where the thickness of material penetrated by the gamma rays changes rapidly and fewer contours occur in the center portion where the thickness does not change as rapidly. It will also be evident that flaws in the welds can be readily observed from an inspection of the diagram.

This invention is particularly useful for determining defects in machine elements castings and the like. An X-ray or gamma graph of the part can be formed on a fluorescent screen and the fluorescent screen may be observed by a television camera and the resulting contours formed in a diagram on the screen of receiver tube 19 by means of the monoscope gate 17. A person may observe such a diagram and thereby determine whether the part should be rejected. The information which is normally fed into the television receiver 19 may be compared with a magnetic tape recording of a satisfactory part having the same information. By comparing the recording on the magnetic tape of the satisfactory part with the information fed from the television camera, the part being inspected may be automatically rejected in the event that the part being inspected has variations beyond an acceptable limit from the recording on the magnetic tape. This may be accomplished by comparison devices which are available.

For assisting doctors, a film recording may be simultaneously made of the image reproduced in receiver tube 14 and the contour diagram formed on the screen of receiver tube 19 whereby the photographic reproductions can be compared. It will be evident that motion pictures may be made of the image and the diagram for simultaneous projection and where the image is formed by a moving object or by a living person, a more complete record can be obtained.

Where the "rungs" of the selected ladder have little height as in ladders 2, 3 and 4 the contours are relatively narrow while where the rungs are of greater height as in ladder 5 the contour lines produced in the diagram will have greater width since the density range falling within the upper and lower limits of a particular "rung" will be greater for ladder 5.

The scanning of a picture or film may be obtained by transmitted or reflected light and one manner of scanning the picture is by means of a flying spot and measuring the reflected or transmitted light with a photo-multiplier tube and using a suitable gating arrangement to reproduce a scanning action on a receiver screen to obtain the density contours within the limits of the selected densities. The gating may be accomplished in a number of ways, the monoscope being particularly effective as described above although biased multivibrators may be used to obtain the triggering action to control the scanning beam in the receiver and to obtain the density contour lines in the receiver screen.

The present invention is adaptable for use with a color television receiver in lieu of black and white receiver 19 and the contour lines or areas in the resulting diagram will appear in successive colors, the rungs of the ladders of the monoscope being arranged to provide for a particular color appearing on the diagram for each rung, for example, the passage of the electron beam across the first rung may produce green, the next blue and third yellow, and other colors being obtainable by the combination of these basic colors. It will therefore be understood that the illustration of definite black and white in the contour diagram should be construed as forming a definite contour line of a definite density corresponding to regions of the selected density rather than being limited to the specific black or white described.

It will also be apparent that other gating means may be used to obtain the contour lines in the diagram but the monoscope gate has been found to be particularly suitable because of the ease of transferring from one gating ladder to another and because of the ease of adjustment for the initial or final density level desired to be indicated in the diagram.

The present equipment has been particularly useful in scientific work of many types and meets a need which has not heretofore been satisfied.

It will be obvious to those skilled in the art that various changes may be made in the invention without departing from the spirit and scope thereof and therefore the invention is not limited by that which is illustrated in the drawings and described in the specification, but only as indicated in the accompanying claims.

What is claimed is:

1. Apparatus for producing a distinct diagram of portions of an image of particular selected densities for assisting in interpreting the image comprising means to scan the image in small increments by a progressive scanning of the entire image, means to simultaneously scan a receiving screen in proportional increments and in registry with the scanning of the image, means effective between the image scanning means and the receiving scanning means to select predetermined density levels of the image and reproduce the increments having such density levels on the receiving screen whereby a diagram will be produced on the receiving screen of the selected densities, said means between the image scanning and receiving scanning means including a monoscope tube having a plurality of ladder patterns.

2. The invention according to claim 1 in which some of the contours are in color with a predetermined order of the colors to assist the reader of the diagram in observing the direction of density change in the image.

3. Apparatus for simultaneously producing a plurality of distinct density contour lines in accordance with the optical density of an image comprising means to progressively scan an image with a first beam of radiant energy, means to produce a signal in response to said first beam of radiant energy proportional to the density of the portion of the image being scanned, adjustable gate means for selecting only portions of the signal which are representative of one of the selected densities of the image between corresponding selected upper and lower limits for each selected density, means to progressively scan a photosensitive element with a second beam of radiant energy, means responsive to said selected portions of said signal to activate and extinguish said second beam of radiant energy whereby contour lines are produced by said second beam of radiant energy on said photosensitive element and accurately represent the said portions of the image having one of the various selected densities between the corresponding selected upper and lower limits for each selected density whereby a diagram of density representing information contained in said portions of the image having one of the selected specific densities between the corresponding selected precise upper and precise lower limits for each one of the selected densities is formed.

4. The invention according to claim 3 in which a single adjustable gating means controls the selected portions of the signal for controlling the activation and extinguishment of said second beam of radiant energy.

5. The invention according to claim 3 in which a monoscope is the adjustable gating means for controlling the second beam of radiant energy.

References Cited by the Examiner
UNITED STATES PATENTS 2,593,925   4/52   Sheldon _____ 178—6
2,648,838   8/53   Raymond _____ 178—6.8

DAVID G. REDINBAUGH, *Primary Examiner.*

JOHN P. WILDMAN, NEWTON N. LOVEWELL,
*Examiners.*